United States Patent [19]

Bowkett

[11] Patent Number: 5,200,124
[45] Date of Patent: Apr. 6, 1993

[54] METHOD AND APPARATUS FOR SHAPING THERMOPLASTIC TUBES

[75] Inventor: Trevor G. Bowkett, Shawbury, England

[73] Assignee: McKechnie Plastics Limited, Glasgow, Scotland

[21] Appl. No.: 788,767

[22] Filed: Nov. 7, 1991

[30] Foreign Application Priority Data

Nov. 13, 1990 [GB] United Kingdom ............... 9024619

[51] Int. Cl.⁵ ............................................. B29C 53/08
[52] U.S. Cl. ......................................... 264/25; 264/26; 264/295; 264/339; 264/348; 425/174.4; 425/174.8 R; 425/384; 425/392
[58] Field of Search ................. 264/25, 26, DIG. 46, 264/295, 339, 347, 348; 425/174.4, 174.8 R, 174.8 E, 384, 174, 392

[56] References Cited

U.S. PATENT DOCUMENTS

| 2,260,517 | 10/1941 | Hamilton . | |
| 2,932,065 | 4/1960 | Jenkins | 264/339 |
| 3,753,635 | 8/1973 | Barnett | 264/339 |
| 3,992,505 | 11/1976 | Tally | 264/295 |
| 4,036,927 | 7/1977 | Stolki | 264/25 |
| 4,336,222 | 6/1982 | Prohn | 264/339 |
| 4,506,144 | 3/1985 | Hesford et al. | 425/174.4 |

FOREIGN PATENT DOCUMENTS

| 1604639 | 2/1971 | Fed. Rep. of Germany . | |
| 240185 | 5/1985 | Fed. Rep. of Germany . | |
| 3436939 | 4/1986 | Fed. Rep. of Germany . | |
| 239761 | 10/1986 | Fed. Rep. of Germany | 425/174.4 |
| 151250 | 8/1962 | U.S.S.R. | 425/174 |
| 0902745 | 8/1962 | United Kingdom . | |
| 935560 | 8/1963 | United Kingdom | 264/339 |
| 1164936 | 9/1969 | United Kingdom . | |
| 1344387 | 1/1974 | United Kingdom . | |
| 1352374 | 5/1974 | United Kingdom . | |
| 1383364 | 2/1975 | United Kingdom . | |
| 1589667 | 5/1981 | United Kingdom . | |
| 2095611 | 10/1982 | United Kingdom . | |

OTHER PUBLICATIONS

European Search Report.
UK Search Report.
Translation of Taiwan Office Action and reference
Patent Abstracts of Japan, vol. 10, No. 196.
Method and apparatus for bending synthetic tube by resistance Heating.

Primary Examiner—Jeffery Thurlow
Attorney, Agent, or Firm—Larson and Taylor

[57] ABSTRACT

A method of and apparatus for shaping thermoplastic tube by external formers using pulsed emission of short wave infra-red radiation to soften the thermoplastic material with the tube held in the required configuration on the formers followed by air cooling to harden the thermoplastic material and retain the required configuration.

20 Claims, 5 Drawing Sheets

METHOD AND APPARATUS FOR SHAPING THERMOPLASTIC TUBES

BACKGROUND OF THE INVENTION

This invention concerns tubes made of thermoplastic material and provides an improved method and apparatus for forming such tubes into required shapes or configurations. As used herein, the term "tube" includes hoses, pipes and similar conduits, whether of single or multi-layer construction.

Tubes of plastics material are used in a wide number of applications and are commonly used in the automotive field as pipe connections for vapour, vent, hydraulic, fuel, coolant or oil lines. In such applications, the tube is often required to be of a specific shape or configuration.

Previously, such shapes have been obtained by special inserts positioned within the tube to conform the tube to the required shape followed by a heating or curing stage to set the required shape following which the insert is removed.

The use of such inserts has been considered essential to prevent the tube wall collapsing during shaping and this has restricted the shapes which can be produced. In particular, multiple bends cannot easily be obtained because of the complexity of the insert and the difficulty of removing the insert.

It is an object of the present invention to provide an improved method and apparatus for shaping thermoplastics tubes which overcomes the aforementioned disadvantages.

SUMMARY OF THE INVENTION

According to a first aspect of the invention, I provide a method of forming a tube of thermoplastic material to a required configuration by the steps of:
a. externally supporting a length of tube of thermoplastic material on at least one former to correspond substantially to the required configuration;
b. heating the tube by infra-red radiation whilst the tube is supported on the former(s);
c. controlling the emission of infra-red radiation and the heating of the tube so that the thermoplastic material becomes sufficiently plastic to deform to the shape of the former(s);
d. cooling the deformed tube so as to retain the shape; and
e. removing the shaped tube from the former(s).

By the invented method, the shaping of the selected tube is carried out by controlled infra-red heating whilst the tube is supported externally.

It has been found that infra-red heating of the thermoplastic material whilst supporting the tube externally can be effected without collapsing the tube wall.

As a result, the problems of internally supporting the tube by special inserts as used in the prior art methods are avoided entirely.

Furthermore, by the invented method, the tube can be formed into complex shapes including multiple bends using one or more former(s) to support the tube externally.

Advantageously, the emission of infra-red radiation is controlled to provide a pulsed or intermittent emission.

In this way, a dwell time is provided between successive emissions of infra-red radiation allowing heat transfer of absorbed energy around the tube by conduction thereby ensuring uniform heating of the tube. As a result, over-heating and melting of the thermoplastics material is avoided.

Additionally or alternatively, the emission of infra-red radiation may be controlled by varying the power and/or intensity of the infra-red radiation.

Preferably, the emission of infra-red radiation is controlled to provide peak power at short wavelengths, preferably in the range 0.7 to 2.0 microns and more preferably at one micron.

As will be appreciated, the emission of infra-red radiation has to be controlled in accordance with the mass of thermoplastic material in the tube and the thermal characteristics of the tube dependent upon its diameter and wall thickness and the rate of heat transfer throughout the mass of the tube.

The emission of the infra-red radiation may be arranged to heat the tube along all or part(s) of the axial length of the tube depending upon the desired configuration. For example, the controlled heating may be provided at a discrete part or parts of the tube to be formed to a particular shape such as a bend.

Conveniently, the shaped tube is set in the required configuration after heating by applying a cooling medium externally and/or internally of the tube.

For example, the tube may be cooled by passing cool or ambient air over the exterior of the tube and/or through the interior of the tube. Preferably, a source of blown air is used so that cooling is completed rapidly.

Other cooling fluids may be used in place of or in addition to air. For example a liquid coolant could be passed through the interior of the tube whilst subjecting the exterior of the tube to air or liquid cooling, for example by blowing air or spraying water over the exterior of the tube.

The desired configuration of the tube may be the final form as required for intended use of the tube or it may be an intermediate configuration. Where the configuration is an intermediate one, then further forming of the tube may take place by repeating the forming steps using a further specially shaped former(s) for supporting the tube externally in the required configuration.

According to a second aspect of the invention, I provide apparatus for carrying out the method according to the first aspect, the apparatus comprising:
a. former means for holding a selected length of tube in a required configuration;
b. a source of infra-red radiation for heating the tube by controlled emission of infra-red radiation; and
c. a source of cooling fluid for cooling the tube to set the required configuration.

In use of the apparatus to carry out the invented method, the selected length of tube is secured and held on the former means so as to conform to the required configuration. The tube is then subjected to the controlled emission of infra-red radiation from the infra-red source for limited heating of the thermoplastic material sufficient to cause deformation of the material without permitting the material to reach a plastic stage in which the tubular walls melt to collapse inwardly. Finally, the tube is set in the required configuration by cooling the thermoplastic material.

Preferably, the former means comprises at least one former having a guide surface for supporting the tube in the required configuration.

Conveniently, the guide surface has a groove in which the tube is received when held in the required configuration.

The groove assists in preventing collapse of the tube wall for the controlled heating of the tube by the infra-red radiation.

Advantageously, the groove provides a seating complementary to the external profile of the tube and the depth of the groove is preferably at least ⅓ the outer diameter (OD) of the tube. More preferably, the depth of the groove is at least ½ the outer diameter and most preferably is in the range 3/5 to 4/5 the outer diameter of the tube.

Preferably, the or each former is made of transparent material, for example polycarbonate or glass, that is substantially unaffected by the infra-red radiation employed for heating the tube.

Where the required configuration is a simple bend, the former may comprise a member having an annular guide surface, for example a wheel or cylinder.

For large or complex bends, the former may comprise a member having a guide surface of special profile to conform to the required shape. Alternatively, the former may comprise a plurality of members arranged such that the respective guide surfaces define the required shape.

Advantageously, the former is arranged to produce a bend having a radius slightly less than the required configuration to allow for relaxation (spring back) of the thermoplastic material on removal of the tube from the former.

Where the required configuration has multiple bends, a separate former may be provided for each bend and the formers arranged to allow the tube to be located in the required configuration for simultaneous formation of each bend.

In one preferred arrangement, a jig is provided having a plurality of formers mounted on a common support base and the length of tube is stretched over one or more of the formers defining the required configuration with one or both ends of the tube being clamped or otherwise secured to resiliently bias the tube into supporting engagement with the former(s).

Advantageously, each former is detachably mounted on the jig. In this way, a worn former can be removed for repair or replacement.

Additionally or alternatively, each former is preferably adjustably mounted for varying its position relative to the other formers.

As a result, by replacing one or more formers with different formers and/or by adjusting the position of one or more formers, the jig can be adapted to produce tubes having a range of configurations.

Preferably, the or each former has an associated source of infra-red radiation arranged to direct emitted radiation towards the tube supported on the former.

Conveniently, the or each source comprises an array of lamps, preferably tungsten-halogen lamps, angularly disposed around the associated former so as to direct the emitted radiation towards the outer surface of the tube supported on the former.

Preferably, each lamp has a reflector for directing accurately the emitted radiation towards the associated former.

Advantageously, each lamp is adjustably mounted for varying the position of the lamp relative to the associated former. In this way, adjustment of the lamp may be combined with adjustment of the former to adapt the apparatus to different required configurations of tube.

In one construction, each lamp is slidably mounted on a pivotal support arm for selective adjustment of the spacing and/or angular position of the lamp relative to the associated former.

Preferably, the or each source is adapted for pulsed or intermittent operation providing a dwell time for thermal transfer of absorbed energy around the tube. As a result, substantially uniform heating of the material of the tube is achieved without reaching a near melting stage in which the tube wall would collapse.

Advantageously, pulsed or intermittent operation of the source(s) is provided by a control unit programmed for timed operation of the source(s).

Alternatively or additionally, the control unit may be responsive to thermal sensing devices located adjacent to the former(s).

The cooling means for setting the required configuration preferably comprises a source of cooling fluid arranged to be applied to the exterior and/or interior of the tube to achieve rapid cooling and quenching of the tube. Air is the preferred cooling fluid but other cooling fluids may be used.

The source of cooling fluid may be connected to a plurality of outlets such as nozzles arranged to direct the cooling fluid over the exterior of the tube.

Alternatively or additionally, the source of cooling fluid may be connected to one end of the tube to pass the cooling fluid through the interior of the tube.

Preferably, the or each former has one or more outlet nozzles arranged to direct cooling fluid over the tube supported on the former and the nozzle(s) are conveniently connected to a common source of cooling fluid.

Advantageously, the outlet nozzle(s) is/are adjustable relative to the associated former for accurately directing the cooling fluid towards the tube supported on the former and/or for adapting the cooling means to different required configurations of tube. For example, the outlet nozzle(s) may be rotatably and/or slidably mounted for altering the angular position and/or spacing relative to the former.

The invention will now be described in more detail by way of example only with reference to the accompanying drawings.

DETAILED DESCRIPTION OF THE EXEMPLARY EMBODIMENTS

Figure 1:
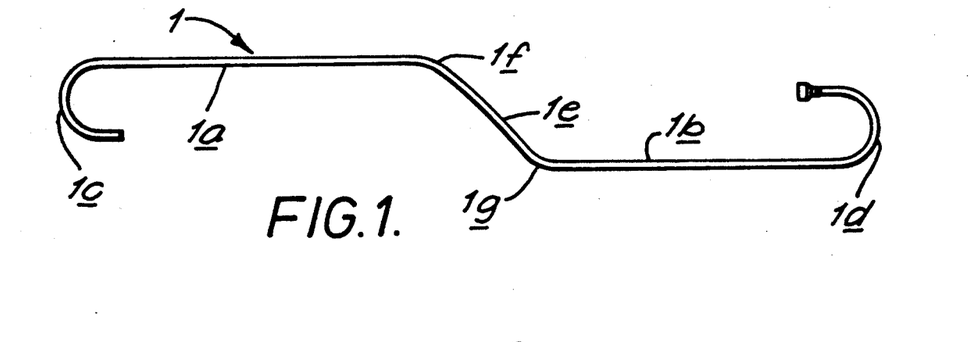
FIG. 1 is a side view of a thermoplastics tube produced by the method and apparatus according to the invention.

Referring first to FIG. 1, a thermoplastics tube 1 of polyamide is shown having offset parallel end portions $1a,1b$ terminating in respective 180° bends $1c,1d$ and an inclined centre portion $1e$ connected to the end portions $1a,1b$ by respective 135° bends $1f,1g$.

The tube is of circular cross-section having an outer diameter of 8 mm and a wall thickness of 1.00 mm. The tube 1 is produced by cutting the required length from an extrusion of the appropriate cross-section and heat forming the bends 1c,1d,1f,1g by irradiation with infrared radiation while holding the tube 1 in the required configuration followed by air cooling to set the tube 1 in the required configuration.

Figure 2:
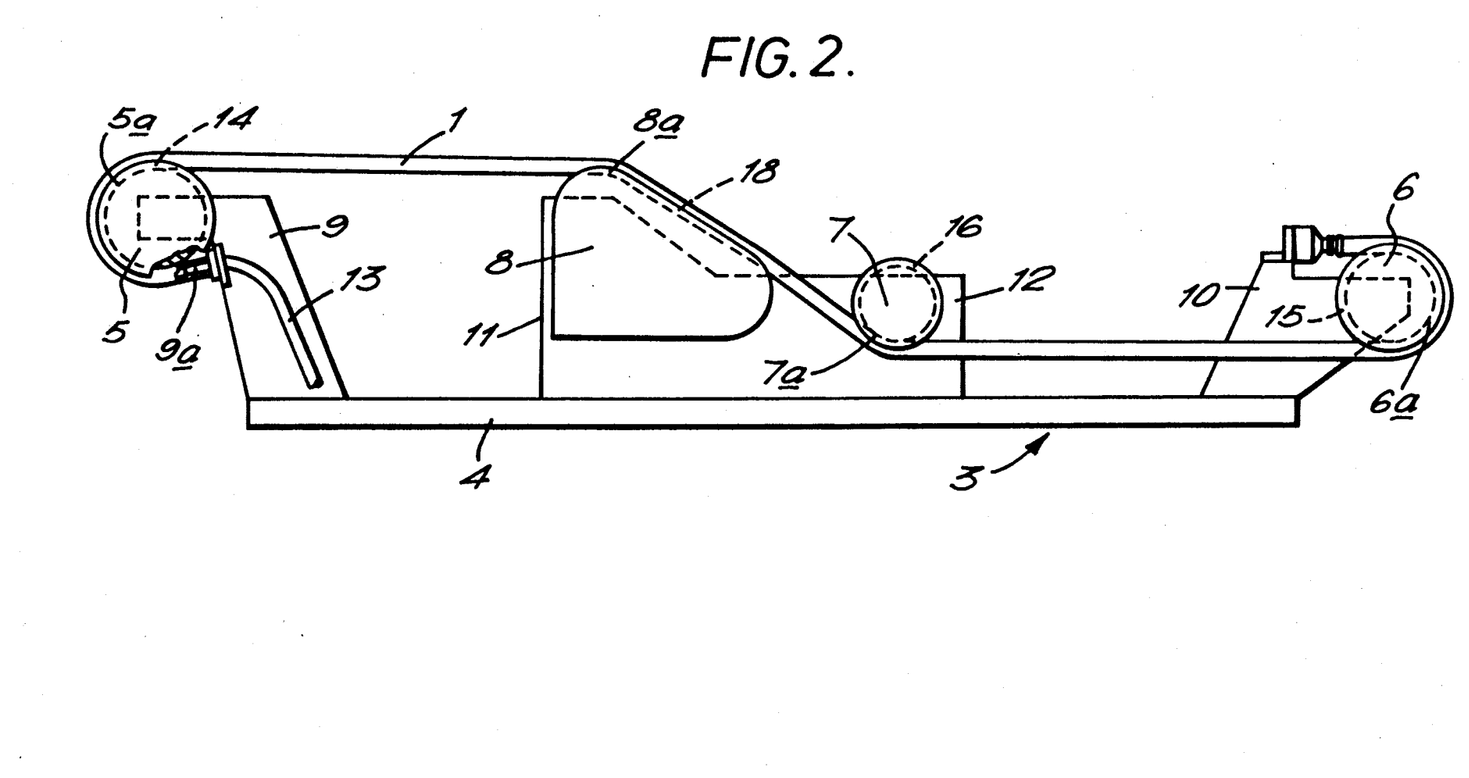
FIG. 2 is a side view of a jig for holding the tube in the required configuration.
Figure 3:
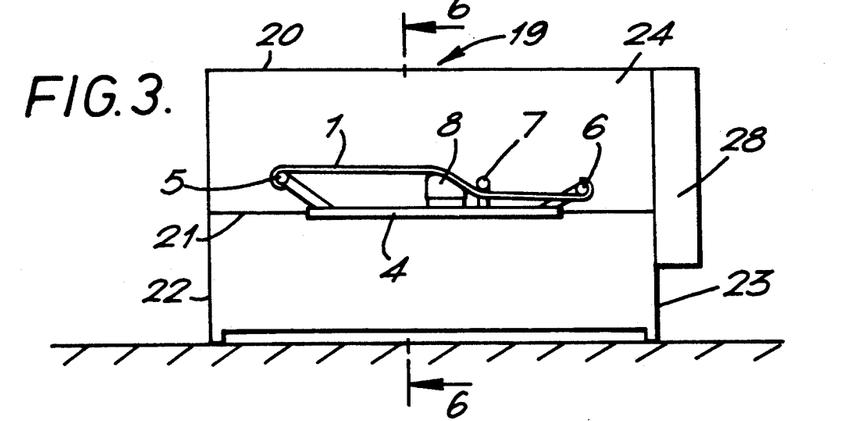
FIG. 3 is an end view of apparatus according to the invention showing the tube of FIG. 1 supported on the jig of FIG. 2.

FIG. 2 shows a jig 3 for holding the tube 1 in the required configuration for heat forming of the bends 1c,1d,1f,1g. The jig 3 is mounted on a rectangular base or table 4 and comprises end formers 5,6 for each of the 180° bends 1c,1d and intermediate formers 7,8 for each of the 135° bends 1f,1g mounted by respective brackets 9,10,11,12.

Each former 5,6,7,8 has a curved guide surface 5a,6a,7a,8a against which the tube 1 is resiliently held by securing releasably the ends of the tube 1 to respective tubular spigots 9a,10a on the end former brackets 9,10. One spigot 9a is connected by a pipe 13 to an air supply (not shown) for passing cooling air through the tube 1.

Each curved guide surface 5a,6a,7a,8a is of smaller radius than the bend 1c,1d,1f,1g formed thereby to allow for relaxation (spring back) of the thermoplastics material on removal of the tube 1 from the jig 3.

Each former 5,6,7,8 has a peripheral groove 14,15,16,17 of which the base forms the guide surface 5a,6a,7a,8a and the opposed sides support the tube 1 and prevent the tube wall collapsing inwards during heat forming of the bend. Each groove 14,15,16,17 has a depth of 5 to 6 mm.

Each end former 5,6 and one intermediate former 7 is of annular shape, for example a wheel or disc. The other intermediate former 8 is of triangular shape additionally arranged to support the centre portion 1e of the tube 1 in a groove 18 along one side edge 8b.

The formers 5,6,7,8 are made of transparent material such as polycarbonate or glass that does not interfere with heating of the tube 1 and is not degraded to any significant extent by the short wave infra-red radiation employed for heating forming of the bends 1c,1d,1f,1g.

The formers are releasably secured to the associated mounting bracket 9,10,11,12 for detaching the former for repair or replacement of a worn former or fitment of a different former.

In a modification, not shown, the formers 5,6,7,8 are adjustable relative to each other for supporting a length of tube in any selected one of a range of different configurations as may be required for alternative end uses of the shaped tube.

Referring now to FIGS. 3 to 6, apparatus is shown for heat forming the bends 1c,1d,1f,1g of the tube 1 supported on the jig 3. The apparatus comprises an open-ended rectangular framework 19 having a top wall 20 and an intermediate wall 21 extending horizontally between opposed parallel side walls 22,23 to define a longitudinally extending processing chamber 24.

The intermediate wall 21 has guides 25 on the upper surface 21a for slidably supporting the base 4 of the jig 3 for advancing movement of the jig 3 through the processing chamber 24.

Figure 4:
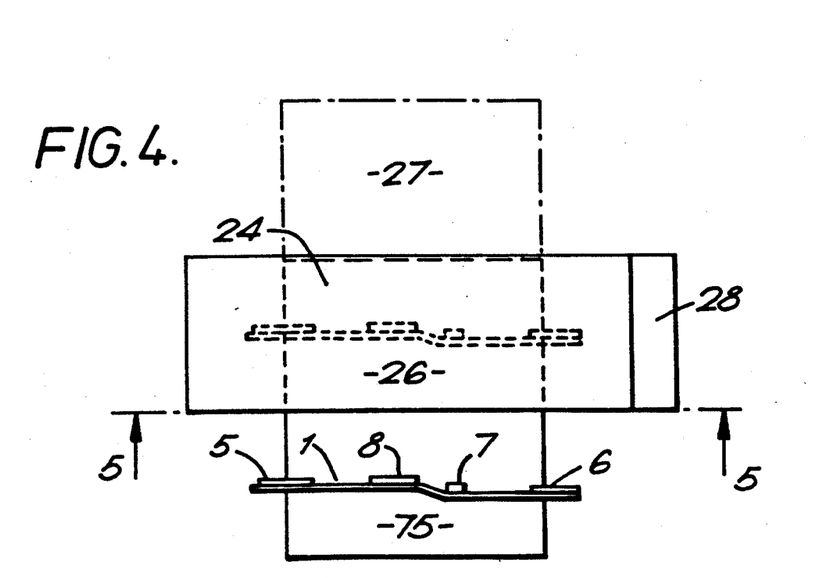
FIG. 4 is a plan view of the apparatus shown in FIG. 3 showing the jig at a load station (full lines) and at a heating and cooling station (broken lines)

As best shown in FIG. 4, the apparatus is arranged to receive the jig 3 at one end of the processing chamber 24 from a loading station 75 at which the tube 1 is located on the formers 5,6,7,8 and to transfer the jig 3 to a heating/cooling station 26 at which the tube 1 is subjected to controlled heating by infra-red radiation followed by air cooling to set the tube 1 in the required configuration. The jig 3 is transferred from the heating/cooling station 26 to an unloading station 27 at the opposite end of the processing chamber 24 for removal of the formed tube 1. The drive for advancing the jig 3 may be a belt, chain or other suitable means (not shown) that is actuated by a control unit 28 mounted on side wall 22 externally of the chamber 24.

Figure 5:
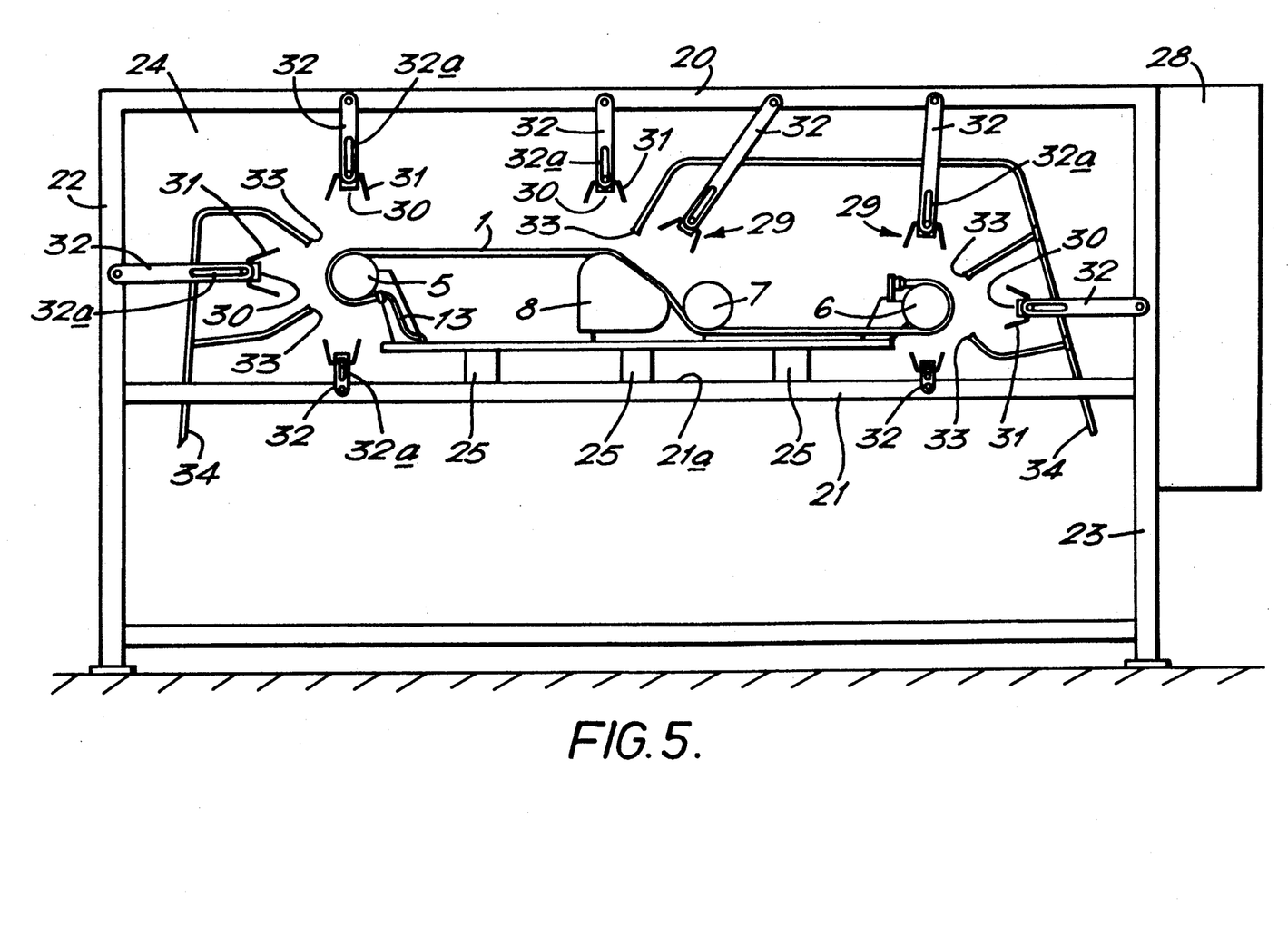
FIG. 5 is a section on the line 5—5 of FIG. 4.
Figure 6:
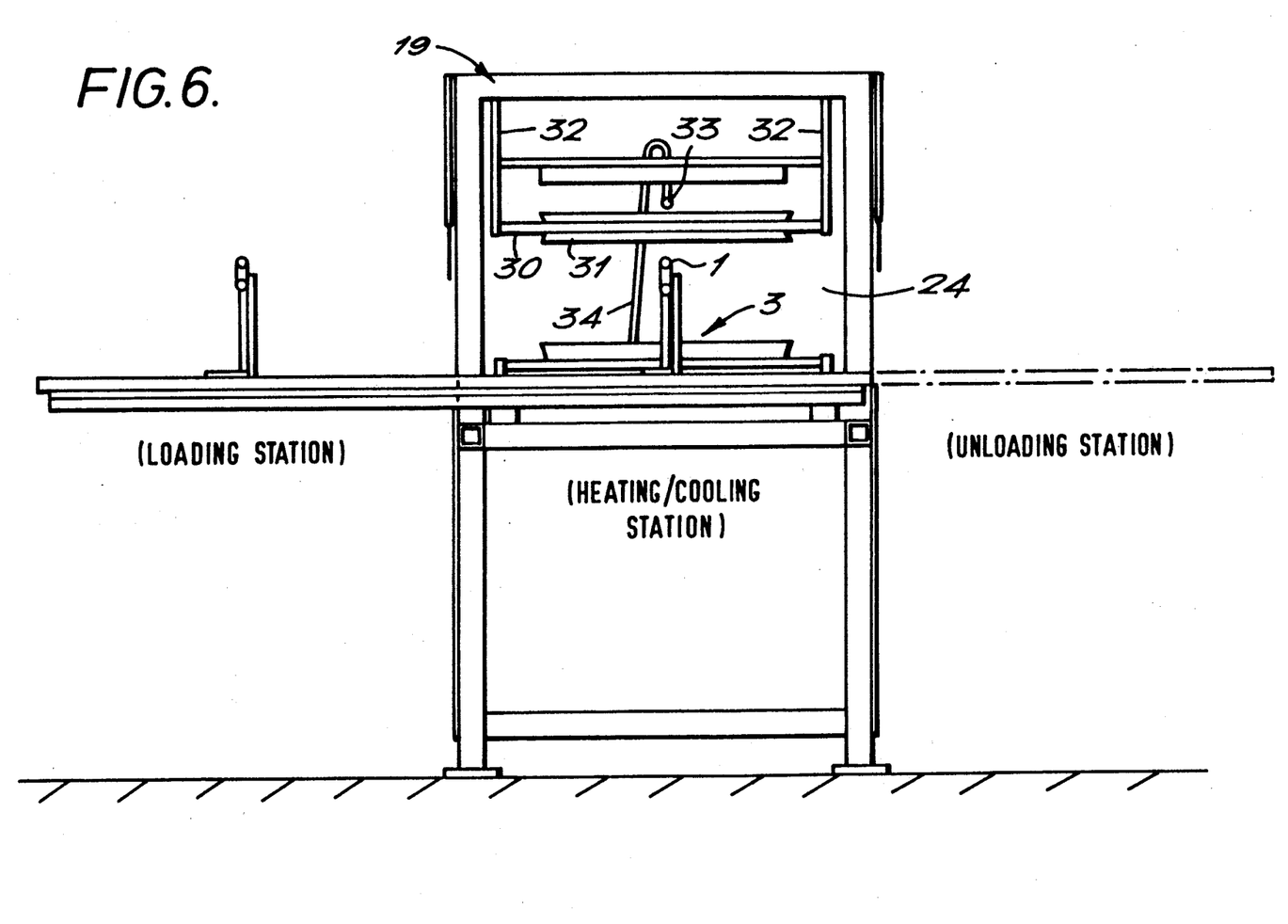
FIG. 6 is a section on the line 6—6 of FIG. 4.

As best shown in FIG. 5, a plurality of infra-red emitters 29 are mounted within the chamber 24 on the top, side and intermediate walls 20,21,22,23 for irradiating the tube 1 supported on the formers 5,6,7,8 at the heating/cooling station 26.

In this embodiment there are three emitters 29 for each end former 5,6 and two emitters for the intermediate formers 7,8. The number and position of the emitters 29 may, however, be altered as desired to suit the size and shape of tube 1.

Each emitter 29 comprises an infra-red lamp 30 and associated reflector 31 for directing the infra-red radiation towards the tube 1. Suitable emitters 29 are tungsten-halogen lamps made from a tube of transparent quartz having a length and diameter chosen to meet the requirements of a given application.

The lamps 30 extend lengthwise of the processing chamber 24 parallel to the direction of movement of the jig 3 and transversely to the length of the tube 1 supported on the formers 5,6,7,8.

Each lamp 30 is mounted at opposed ends by a pair of support arms 32. Each arm 32 is pivotally connected at one end to the adjacent framework wall 20,21,22,23 and is formed with a slot 32a at the other end in which the lamp 30 is slidably mounted for lengthwise adjustment along the arm 32. In this way, the angular position and/or spacing of each lamp 30 relative to the adjacent former 5,6,7,8 can be selected for best results.

In particular, the lamps 30 can be arranged to direct the infra-red radiation for localised heating of the tube 1 along its length to form the bends 1c,1d,1f,1g. Also, the position of the lamps 30 can be adapted for different tube configurations and the apparatus is not limited to the tube configuration shown in FIG. 1.

Infra-red radiation emitted by the lamps 30 is directed towards and absorbed by the outer facing surface of the tube 1.

In this embodiment, the base 4 is shown mounting one jig 3 only for simplicity. It will be understood, however, that the length of the lamps 30 may be selected to allow a plurality of jigs 3 each comprising one or more formers to be mounted on the base 4 for heat forming several tubes 1 simultaneously. Alternatively, the jig 3 may be constructed and arranged to mount a plurality of tubes 1 in spaced relationship. For example, the formers may be of elongate form with the tubes 1 spaced apart along the length thereof.

The lamps 30 are controlled for pulsed or intermittent operation by the control unit 28 which is programmable for setting the duration of and interval between successive pulses or bursts of infra-red radiation.

In this way, uniform heating of the tube 1 around its circumference is obtained by allowing thermal conduction through the mass of the tube between each pulse or burst.

The timed operation of the lamps 30 is determined by a number of factors including the diameter of the tube 1, thickness of the tube wall, the thermoplastics material of the tube, the number, size and power of the lamps 30 etc, and is set to ensure that the tube 1 is only heated to a sufficient degree to soften the thermoplastics material for conforming to the required configuration and overheating sufficient to melt the thermoplastic material and cause the tube wall to collapse is avoided.

On completion of the heating stage to form the bends 1c,1d,1f,1g, the tube 1 is rapidly cooled to set the required configuration.

The cooling is effected by blowing air or other suitable cooling gas onto the exterior of the tube 1 and/or through the interior of the tube 1 for a pre-set period of time controlled by programming the control unit.

For external cooling, a plurality of outlet nozzles 33 connected by supply pipes 34 to a source of blown air are arranged to direct the air onto the surface of the tube supported on the formers 5,6,7,8. For internal cooling, spigot 9a is connected by pipe 13 to the source of blown air for passing air through the interior of the tube 1.

In this embodiment, two nozzles 33 are associated with each end former 5,6 and one nozzle 33 with both of the intermediate formers 7,8. The number and arrangement of the outlet nozzles 33 may, however, be altered as desired to suit different tube configurations.

Additionally, the nozzles 33 may be adjustably mounted for altering the angular position and spacing relative to the adjacent former 5,6,7,8 to suit different tube configurations.

The nozzles 33 are positioned between the lamps 30 and the cooling stage is performed after the heating stage with the jig 3 at the same station 26 within the chamber 24. In this way rapid cooling of the tube 1 can be effected immediately following heating of the tube 1 sufficient to conform to the required shape.

For certain applications, however, it may be preferable to effect the heating and cooling stages at separate stations spaced apart lengthwise of the chamber 24. Such arrangement, reduces cycle times and may be employed advantageously for automated mass production.

As will be understood, the invented method and apparatus has many advantages over the prior art methods and apparatus for shaping thermoplastics tube. In particular, the use of internal formers is eliminated by the use of controlled infra-red heating whilst externally supporting the tube in the required configuration.

The emission of the infra-red radiation and the subsequent setting of the required configuration is controlled through a programmable control unit and can be set up to suit a wide range of different materials and requirements.

The apparatus can be adapted for different tube configurations by appropriate selection of the number, size, shape and arrangement of the formers to produce a jig for the required configuration.

A plurality of bases or tables 4 may be assembled to form an endless loop with adjoining edges of adjacent bases 4 articulated to each other by suitable pivot connections. In this way, empty jigs are automatically returned from the unloading station to the loading station for continuous operation under the control of the control unit. Such arrangement is particularly, suitable for mass production of tubes having a particular configuration.

Alternatively, the base or table 4 can be arranged and adapted for reciprocating movement of the jig between a common loading and unloading station and the processing station under the control of the control unit. This arrangement is more compact and may be preferred for short production runs where only a limited number of specially shaped tubes may be required.

Figure 7:
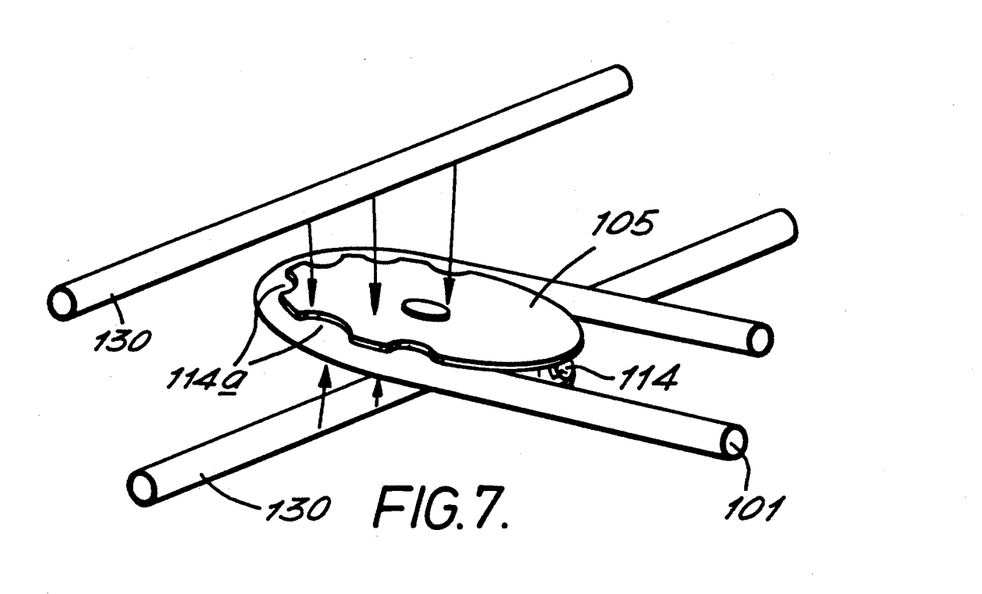
FIG. 7 shows an alternative former adapted for side heating.

The invention is not limited to the embodiment above-described, for example, the formers may be adapted for heating the tube 101 by infra-red radiation sources 130 arranged on one or both sides by the provision of suitable cutouts 114a in the sides of the locating groove 114 as shown in FIG. 7. These cut-outs should not exceed the depth of the groove and are preferably not more than half the depth of the groove.

Figure 8:
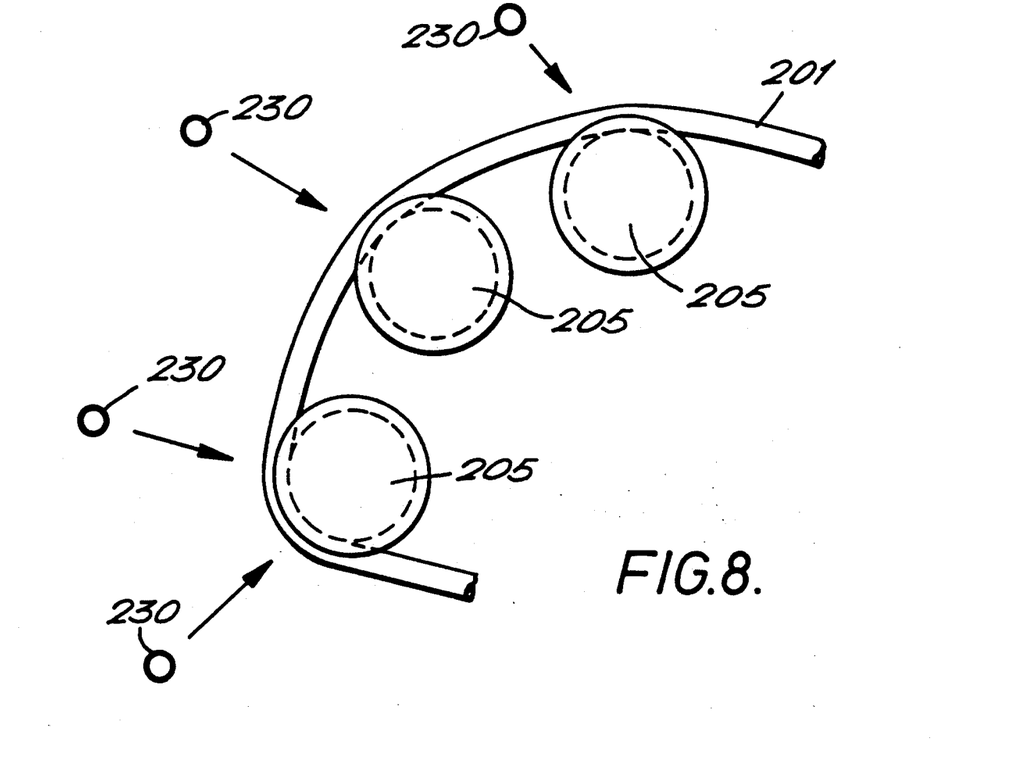
FIG. 8 shows another former adapted for producing complex shapes.

Complex bend shapes may be produced by a former comprising a plurality of members 205 arranged to define the required profile with an array of infra-red heat sources 230 for heating the tube 201 as shown in FIG. 8. Each of the members 230 may be mounted so as to be adjustable relative to the others for producing a range of different profiles.

Although the invention has been described with reference to a thermoplastics tube of polyamide, it will be understood that the invented method and apparatus has application to a wide range of thermoplastics materials including polyurethane, polyethylene, polypropylene, polyvinylchloride, polyacetal and other elastomers and copolymers of these thermoplastics.

Furthermore, tubes produced by the invented method and apparatus may comprise a single thermoplastics material or combinations of two or more different thermoplastics materials. For example, a tube wall comprising layers of different thermoplastics material may be obtained by co-extrusion of the thermoplastics material.

Additionally, tubes produced by the invented method and apparatus may be unreinforced as in the above embodiment or include a reinforcement. For example, a reinforcement layer such as a metallic or non-metallic sleeve may be incorporated in the tube wall during manufacture. Alternatively, reinforcement material, such as glass or carbon fibre may be incorporated into the thermoplastics material forming the tube wall.

Tube produced by the invented method and apparatus may be used for a wide range of diverse applications including fuel pipes, fuel vapour pipes, ventilation pipes, drain pipes, vacuum pipes, coolant hoses and hydraulic hoses. Each of these applications may require specific grades of thermoplastics materials to be used with or without reinforcement as mentioned above and/or end fittings at one or both ends to connect the tube for its intended use.

I claim:

1. A method of forming a bend in a tube of thermoplastic material comprising the steps of:
   providing a former and an associated infra-red radiation source spaced from said former;
   externally supporting the tube on said former prior to heating the tube to pre-form a bend corresponding to a required bend configuration;
   holding the tube stationary relative to said former and controlling the emission of infra-red radiation from said radiation source to heat the bend and soften the thermoplastic material for conformation to the required bend configuration;
   cooling the tube to set the thermoplastic material for retaining the required bend configuration while holding the tube stationary relative to said former; and
   removing the tube from said former with the bend formed therein.

2. A method according to claim 1 wherein the emission of infra-red radiation is controlled to provide a pulsed or intermittent emission.

3. A method according to claim 1 wherein short wavelength infra-red radiation having peak energy emission in the range of 0.7 to 2.0 microns is used for heating the tube.

4. A method according to claim 1 wherein local heating of the tube is effected simultaneously at a plurality of positions spaced apart along the length of the tube.

5. A method according to claim 1 wherein the tube is air cooled.

6. Apparatus for forming a bend in a tube of thermoplastic material comprising:
   external former means for supporting the tube to preform a required bend configuration prior to heating the tube;
   means for holding the tube stationary relative to said former means;
   a source of infra-red radiation associated with said former means for heating the tube to soften the thermoplastic material for conformation to the required bend configuration, said infra-red radiation source being spaced from said former means and from an outer surface of the tube supported thereon; and
   a source of cooling fluid for cooling the tube to set the thermoplastic material to retain the required bend configuration.

7. Apparatus according to claim 6 wherein an outer surface of the tube is located against a guide surface of the former means, said guide surface providing a seating substantially complementary to the cross-section of the tube for supporting the tube wall.

8. Apparatus according to claim 7 wherein the seating comprises a groove having a depth in the range 3/5 to 4/5 the outer diameter of the tube.

9. Apparatus according to claim 6 wherein the former means is transparent.

10. Apparatus according to claim 6 wherein the former means has a radius of curvature slightly less than the required radius of curvature of the formed tube.

11. Apparatus according to claim 6 wherein the source of infra-red radiation comprises at least one lamp having an associated external reflector for directing the infra-red radiation towards the former means.

12. Apparatus according to claim 11 wherein the or each lamp is adjustably mounted for varying the position thereof relative to the former means.

13. Apparatus according to claim 12 wherein the or each lamp comprises a tube extending between opposed support arms mounted for pivotal movement for adjusting the angular position of the tube relative to the former means, and the tube is mounted for sliding movement along the arms for adjusting the distance of the tube from the former means.

14. Apparatus according to claim 6 wherein the infra-red radiation source is adapted for pulsed or intermittent operation.

15. Apparatus according to claim 6 wherein the source of cooling fluid is connected to at least one outlet arranged to direct cooling fluid over the exterior of the tube.

16. Apparatus according to claim 15 wherein the or each outlet is adjustable to vary the position relative to the former means.

17. Apparatus according to claim 6 wherein the former means comprises a plurality of formers mounted on a base table and the formers are adjustable and/or interchangeable for externally supporting the tube in any desired configuration.

18. Apparatus according to claim 17 wherein the base table is mounted for reciprocating movement relative to the infra-red radiation source and cooling source.

19. Apparatus according to claim 17 comprising a plurality of base tables articulated to each other to form an endless loop for movement relative to the infra-red radiation source and cooling source.

20. A method of forming a bend in a tube of thermoplastic material comprising:
   providing a former having a guide surface corresponding substantially to a bend corresponding to a required bend configuration and an associated source of infra-red radiation spaced from said guide surface;
   positioning the tube on said former with an external surface of the tube located against said guide surface prior to heating the tube;
   holding the tube stationary relative to said former and heating the bend of the tube supported on said former by pulsed or intermittent emission of short wave infra-red radiation from said associated source to soften the thermoplastic material for conformation to the required bend configuration;
   cooling the tube to set the thermoplastic material and retain the required bend configuration while holding the tube stationary relative to said former; and
   removing the tube from said former with the bend formed therein.

* * * * *